United States Patent [19]

Masuhara et al.

[11] 3,988,274

[45] Oct. 26, 1976

[54] PROCESS FOR PRODUCING SOFT CONTACT LENSES

[75] Inventors: Eiichi Masuhara; Niro Tarumi, both of Tokyo; Makoto Tsuchiya, Musashino, all of Japan

[73] Assignee: Hoya Lens Co., Ltd., Tokyo, Japan

[22] Filed: Feb. 6, 1975

[21] Appl. No.: 547,543

[30] Foreign Application Priority Data

May 27, 1974 Japan................................ 49-59479

[52] U.S. Cl. ..................... 260/29.7 H; 260/29.7 T; 260/77.5 UA; 264/1; 526/160; 526/320; 526/328; 516/318

[51] Int. Cl.$^2$ ................. C08F 18/24; C08F 216/02; B29D 11/00

[58] Field of Search ....... 260/80.75, 29.7 H, 29.7 T, 260/77.5 UA, 78.5 BB, 78.5 R; 264/1

[56] References Cited

UNITED STATES PATENTS

| | | | |
|---|---|---|---|
| 2,998,414 | 8/1961 | West et al. ......................... | 260/80.75 |
| 3,503,942 | 3/1970 | Seiderman ......................... | 260/80.75 |
| 3,598,770 | 8/1971 | Moore et al. ...................... | 260/80.75 |
| 3,699,089 | 10/1972 | Wichterle ......................... | 260/86.1 N |
| 3,728,315 | 4/1973 | Gustafson ......................... | 260/80.75 |
| 3,803,093 | 4/1974 | Neefe................................ | 264/1 |
| 3,807,398 | 4/1974 | Grucza.............................. | 128/260 |
| 3,822,089 | 7/1974 | Wichterle ......................... | 260/86.1 N |
| 3,880,818 | 4/1975 | Shen et al......................... | 260/80.75 |

*Primary Examiner*—John C. Bleutge
*Assistant Examiner*—Thurman K. Page
*Attorney, Agent, or Firm*—Hill, Gross, Simpson, Van Santen, Steadman, Chiara & Simpson

[57] ABSTRACT

A soft contact lens having a water content of at least 45% and a tensile strength of at least 100 g/mm$^2$ can be produced by pouring into a mold a composition consisting of 70 to 93% by weight of an alkylene glycol monoacrylate or monomethacrylate, 0.3 to 2.0% by weight of a polyfunctional monomer, 1 to 10% by weight of a monomer having at least one carboxyl group in its molecule and 5 to 20% by weight of an acrylic or methacrylic acid derivative, raising the temperature of the composition from 35° C to 110° C continuously to effect polymerization, processing the resulting formed product into a lens, and then swelling the lens thus obtained by hydration treatment including alkali treatment.

11 Claims, No Drawings

PROCESS FOR PRODUCING SOFT CONTACT LENSES

The present invention relates to soft contact lenses and a process for producing the same. More particularly, the invention pertains to soft contact lenses having a water content $$\left(\frac{\text{hydrated weight} - \text{dry weight}}{\text{hydrated weight}} \times 100\%\right)$$

of at least 45% and a tensile strength of at least 100 g/mm² and a process for producing the same.

Hydrophilic contact lenses, or soft contact lenses, are superior to hard contact lenses produced mainly from acrylic resins in adaptability to the eyes and in oxygen permeability and have recently been popularized. However, prior art soft contact lenses are still insufficient in the oxygen permeability requirements of the cornea and are often inferior to hard contact lenses in their ability to correct ametropia, and further have the defect that they are easily damaged during handling owing to their fragility.

Most of the prior art soft contact lenses consist mainly of 2-hydroxyethyl methacrylate (ethylene glycol monomethacrylate),

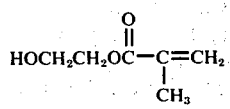

(hereinafter referred to as "2-HEMA"). The water content of these soft contact lenses is usually about 40%. In general, with an increase in water content, the oxygen permeability of soft contact lenses increases, their adaptability to the eyes is improved, and foreign body sensation is decreased. Therefore, copolymerization of 2-HEMA with another hydrophilic monomer or polymer for increasing water content have heretofore been attempted. In most cases, however, the copolymerization is incomplete and the dimensions of the lenses (base curve, diameter and power) tend to become unstable owing to the dissolution of the unreacted monomer or water-soluble homopolymer on water absorption and swelling. Also, the lenses become too soft owing to their increased water content. Therefore, soft contact lenses have been optically unstable and inferior to hard contact lenses in their ability to correct vision. Also, these lenses have been defective in that they have a lower strength in a hydrated and swollen state and are easily damaged under careless handling. In soft contact lenses, a high water content is required for obtaining sufficient oxygen permeability and adaptability to the eyes and a high strength is required to avoid damage during handling.

It is, therefore, the principal object of the present invention to provide soft contact lenses having a high water content and a high tensile strength which overcome the disadvantages and deficiencies of soft contact lenses of prior art.

It is a further object to provide a process of producing such soft contact lenses.

These and other objects and advantages of the invention will be apparent from the following description of the invention.

As a result of various studies on polymerization composition and the process of hydration in order to produce a soft contact lens having a high water content of at least 45% and a tensile strength of at least 100 g/mm² and consisting mainly of an alkylene glycol monomethacrylate, the present inventors have now found the composition of base material and a process of hydration of the base material for obtaining an optically excellent soft contact lens having a higher water content and a greater strength than soft contact lenses of prior art.

The base material for the soft contact lenses according to the present invention consists of 70 to 93% by weight of an alkylene glycol monomethacrylate or monoacrylate, 0.3 to 2.0% by weight of a polyfunctional monomer, 1 to 10% by weight of a monomer having at least one carboxyl group in its molecule (such as, for example, acrylic acid, methacrylic acid or itaconic acid) and 5 to 20% by weight of a methacrylic or acrylic acid derivative, and can be obtained by adding a standard radical polymerization catalyst to a mixture of these components, mixing uniformly, and then subjecting the mixture to casting polymerization through a method of continually increasing the temperature from 35° C to 110° C.

More particularly, the alkylene glycol monomethacrylates represented by the formula,

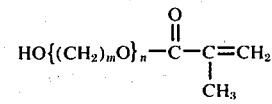

wherein $m$ is 2, 3 or 4 and $n$ is 1, 2, 3, .... or 1000, which may be used in the present invention, are exemplified by monomethacrylates of ethylene glycol ($HOCH_2CH_2OH$), propylene glycol ($HOCH_2CH_2CH_2OH$), diethylene glycol ($HOCH_2CH_2OCH_2CH_2OH$), tetraethylene glycol ($HOCH_2CH_2OCH_2CH_2OCH_2CH_2OCH_2CH_2OH$) and polyethylene glycol ($HO(CH_2CH_2O)_nH$, $n = 5 - 1000$). The alkylene glycol monomethacrylates are the main components of the base material for the soft contact lenses of the present invention. Ethylene glycol monomethacrylate (2-HEMA) is a representative example thereof, but monoacrylates of the above-mentioned glycols may be also used.

The polyfunctional monomers which may be used as a cross-linking agent in the present invention are exemplified by ethylene glycol dimethacrylate

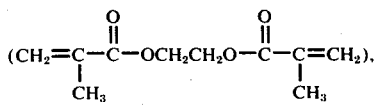

diethylene glycol dimethacrylate

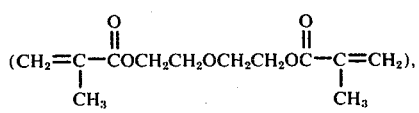

triethylene glycol dimethacrylate

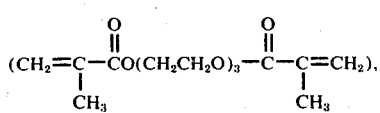

tetraethylene glycol dimethacrylate

-continued

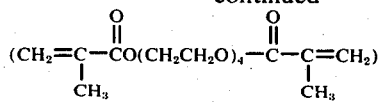

polyethylene glycol dimethacrylate

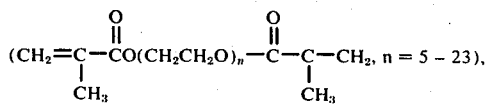

butylene glycol dimethacrylate

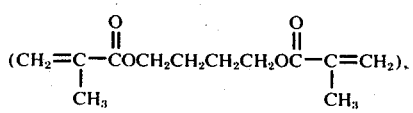

neopentyl glycol dimethacrylate

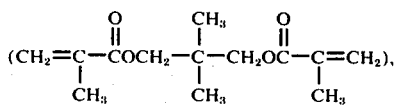

propylene glycol dimethacrylate

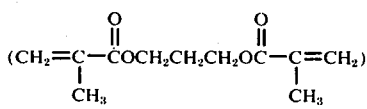

and diethylene glycol bisallylcarbonate

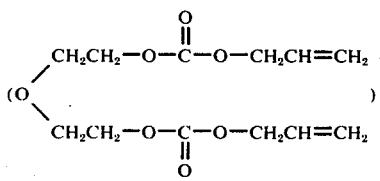

These polyfunctional monomers are added to effect the stabilization of the polymer and the stabilization of the lens by forming a three-dimensional structure.

Also, the monomers having at least one carboxyl group in their molecule which may be used in the present invention are exemplified by acrylic acid ($CH_2$=CHCOOH), methacrylic acid

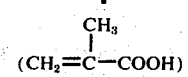

and itaconic acid

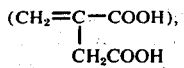

but are not limited to these compounds so long as the above-mentioned conditions are satisfied. This component serves to increase the water content of the soft contact lenses.

The methacrylic acid derivatives

which may be used in the present invention include methyl (R = $CH_3$), ethyl (R = $C_2H_5$), n-propyl (R = n-$C_3H_7$), n-butyl (R = n-$C_4H_9$) and n-hexyl (R = n-$C_6H_{11}$) esters. Although these monomers will tend to reduce the water content, they serve to increase the strength of the material in the hydrated state. Further, acrylic acid derivatives ($CH_2$ = CHCOOR) may be used. n-Butyl methacrylate

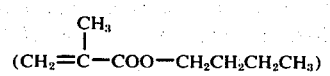

is particularly preferable in that it serves to greatly increase the strength of the polymer in the hydrated state. However, this effect is produced only by combining this component with the water content-increasing component and the new hydration method as described below. Unless the new hydration method is utilized, the adaptability to the eyes will decrease and even the loss of elasticity may be brought about even though the lens made by copolymerization of a glycol monoacrylate or monomethacrylate and an acrylic acid or methacrylic acid derivative may reduce the water content and increase the strength slightly.

As the radical polymerization catalyst, benzoyl peroxide 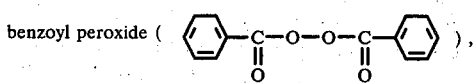, lauroyl peroxide 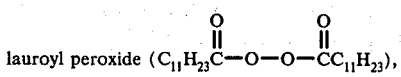, cumene hydroperoxide 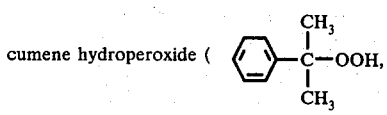

di-tert-butyl peroxide 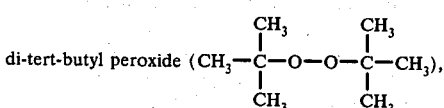, diisopropyl peroxycarbonate 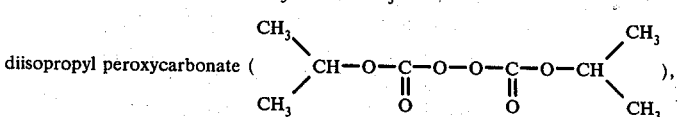, azobisisobutyronitrile 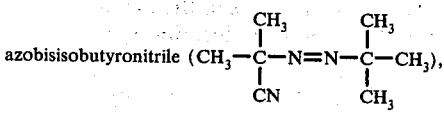, etc. may be used.

In the present invention, these respective components are mixed and the mixture is poured into a metal, glass or plastic mold. The polymerization is then completed by increasing the temperature of the mixture from 35° C to 110° C continuously in an electric oven. In general, the polymerization has heretofore been carried out by increasing the temperature in stages, but the continuous temperature increasing method is more suitable for producing a uniform polymer. After the completion of the polymerization, the molded product is removed from the mold and finished into a lens by the usual lathe cutting, grinding and polishing process. The resulting hard lens is then immersed in a hydrating solution. This step is one of the characteristics of the present invention and is related to the fact that the polymer contains a carboxyl group. Thus, the lens in a dry state is immersed in normal saline solution (pH 8.0 to 12.0) containing sodium carbonate ($Na_2CO_3$), potassium carbonate ($K_2CO_3$), lithium carbonate ($Li_2CO_3$), sodium hydrogen carbonate ($NaHCO_3$), potassium hydrogen carbonate ($KHCO_3$) or the like at room temperature or at a higher temperature. Thereafter, the lens is immersed in 0.9% normal saline solution and allowed to stand at room temperature, or hydration is effected by warming and renewing the normal saline solution several times. Alternatively, the lens may be first treated with normal saline solution, treated with an alkaline solution and then treated with normal saline solution again. Unless the polymer of the present invention is treated with an alkaline solution as described above, the water content will not exceed 40% and the elasticity required of contact lenses cannot be obtained. Therefore, the alkali treatment is an essential process in the present invention.

The effects obtained by the present invention will be explained below specifically.

Water content:

Most soft contact lenses of prior art have a water content of about 40%, whereas in the case of the soft contact lenses of the present invention, the water content can be freely controlled from, of course, less than 40% to any water content above 40 up to 90%. It is considered that oxygen permeability and adaptability to the eyes are improved with an increase in water content. In the case of contact lenses of prior art, however, if the water content is excessively increased, the lenses often become too soft resulting in unstable vision and a decrease in their ability to correct corneal astigmatism. On the other hand, in the case of the soft contact lenses of the present invention, even if the water content is increased, the required hardness can be maintained. Unstable vision and a decrease in the ability to correct corneal astigmatism is, therefore, rarely observed.

Oxygen permeability:

The epithelium of the cornea requires oxygen, which is usually supplied from the oxygen dissolved in tears. When a soft contact lens is worn, most of the oxygen is supplied through tear exchange caused by the pumping action of the lens during blinking. However, it is said that oxygen deficiency of the corneal epithelium is alleviated in the case of soft contact lenses as compared with hard contact lenses since soft contact materials are, themselves, slightly permeable to oxygen. In the case of soft contact lenses of 2-HEMA series, oxygen permeability increases with an increase in water content. Homopolymer of 2-HEMA (water content about 40%) shows an oxygen permeability coefficient of about $5 \times 10^{-10}$ cc(STP) cm/$cm^2$.sec.cmHg, but a soft contact lens having a water content of about 60% according to the present invention shows an oxygen permeability of (16 to 17) $\times 10^{-10}$ cc(STP) cm/$cm^2$.sec.cmHg and has an ability of permeating a large amount of oxygen. Oxygen deficiency at the corneal epithelium is considered to be less than in soft contact lenses of prior art.

Strength:

Strength is related to the life of lenses and is an important requirement in soft contact lenses. In spite of the high water content, the lenses of the present invention demonstrate a tensile strength of 250 g/$mm^2$ even at a water content of 60%. This value is about four times the tensile strength of prior art 2-HEMA polymer having a water content of 40% (about 80 g/$mm^2$). Therefore, there is little possibility that the lenses of the present invention will be damaged under normal handling.

Optical characteristics:

It is generally recognized that it is more difficult to correct vision with soft contact lenses than with hard contact lenses. However, if the lenses have a certain degree of firmness in the hydrated state and greater surface accuracy can be attained, the optical properties of the lenses are usually good. In spite of their high water content, the soft contact lenses of the present invention have the firmness necessary to maintain optically accurate surfaces and can, thus, correct vision more readily than soft contact lenses of prior art. Further with the soft contact lenses of the present invention, it is comparatively easy to correct corneal astigmatism.

A comparison between the physical properties of a soft contact lens according to the present invention and those of commercially available soft contact lenses is shown in Table 1.

Table 1

| | Physical properties of soft contact lenses | | |
| --- | --- | --- | --- |
| | Lens of the present invention | Commercially available lens | |
| | | A | B |
| Water content (%) | 56 | 35 | 37 |
| Specific gravity | 1.14 | 1.19 | 1.18 |
| Refractive index | 1.40 | 1.44 | 1.44 |
| Tensile strength (g/$mm^2$) | 260 | 76 | 140 |
| Oxygen permeability coefficient (cc(STP) . cm/$cm^2$ . sec . cmHg) | $16 \times 10^{-10}$ | $6 \times 10^{-10}$ | $7 \times 10^{-10}$ |

The following examples, in which all parts are expressed by weight unless otherwise indicated, will serve to illustrate the practice of the invention in more detail.

EXAMPLE 1

To a mixture of 86.5 parts of ethylene glycol monomethacrylate, 0.3 part of ethylene glycol dimethacrylate, 3.0 parts of methacrylic acid and 10.0 parts of ethyl methacrylate was added 0.2 part of azobisisobutyronitrile. The mixture was stirred thoroughly, poured into a mold and then subjected to polymerization in an electric furnace which could be heated continuously from 35° C to 110° C. After the completion of the polymerization, the polymer was released from the mold and processed into a lens by carrying out the usual cutting, grinding and polishing. The resulting hard lens was then immersed in 2% sodium bicarbonate normal saline solution at room temperature for two hours and then treated with fresh normal saline solution every hour for four times at 80° to 85° C. The soft contact lens thus obtained had a high water content and a high tensile strength.

EXAMPLE 2

To a mixture of 86.9 parts of ethylene glycol monomethacrylate, 0.5 part of diethylene glycol dimethacrylate, 2.5 parts of methacrylic acid and 10.0 parts of methyl methacrylate was added 0.1 part of diisopropylperoxycarbonate. Lens processing was carried out in the same manner as in Example 1, treated with normal saline solution at 80° to 85° C for two hours and then treated with 0.5% potassium carbonate normal saline solution at 80° to 85° C for one hour. Further, treatment with normal saline solution was repeated four times in the same manner. The soft contact lens thus obtained had a high water content and a high tensile strength, and its optical properties were good.

EXAMPLE 3

To a mixture of 86 parts of propylene glycol monomethacrylate, 0.9 part of tetraethylene glycol dimethacrylate, 5 parts of itaconic acid and 8 parts of n-butyl methacrylate was added 0.1 part of diisopropylperoxycarbonate. In the same manner as in Example 1, a soft contact lens having a high water content and a high tensile strength was obtained.

What is claimed is:

1. A soft contact lens having a water content of at least 45% and a tensile strength of at least 100 g/mm$^2$ and consisting essentially of a copolymer of 70 to 93% by weight of an alkylene glycol monoacrylate or monomethacrylate, 0.3 to 2.0% by weight of a polyfunctional monomer consisting of a diester of a polyethylene glycol, 1 to 10% by weight of an unsaturated aliphatic monomeric acid having at least one carboxyl group in its molecule and 5 to 20% by weight of an alkyl acrylate or methacrylate, said lens having been swelled by hydration in an aqueous alkaline solution.

2. A soft contact lens according to claim 1, wherein said alkylene glycol monoacrylate or monomethacrylate is selected from monoacrylates or monomethacrylates of ethylene glycol, propylene glycol, diethylene glycol, tetraethylene glycol and polyethylene glycols.

3. A soft contact lens according to claim 1, wherein said polyfunctional monomer is selected from ethylene glycol dimethacrylate, diethylene glycol dimethacrylate, triethylene glycol dimethacrylate, tetraethylene glycol dimethacrylate, polyethylene glycol dimethacrylates, butylene glycol dimethacrylate, neopentyl glycol dimethacrylate, propylene glycol dimethacrylate and diethylene glycol bisallylcarbonate.

4. A soft contact lens according to claim 1, wherein said monomer having at least one carboxyl group in its molecule is selected from acrylic acid, methacrylic acid and itaconic acid.

5. A soft contact lens according to claim 1, wherein said acrylic or methacrylic acid derivatives is selected from methyl acrylate, ethyl acrylate, n-propyl acrylate, n-butyl acrylate, n-hexyl acrylate, methyl methacrylate, ethyl methacrylate, n-propyl methacrylate, n-butyl methacrylate and n-hexyl methacrylate.

6. A process for producing a soft contact lens which comprises pouring into a mold a composition consisting of 70 to 93% by weight of an alkylene glycol monoacrylate or monomethacrylate, 0.3 to 2.0% by weight of a polyfunctional monomer consisting of a diester of a polyethylene glycol, 1 to 10% by weight of an unsaturated aliphatic monomeric acid, having at least one carboxyl group in its molecule and 5 to 20% by weight of an alkyl acrylate or methacrylate, raising the temperature of the composition from 35° C to 110° C continuously to effect polymerization, processing the resulting formed product into a lens, and then swelling the lens thus obtained by hydration treatment including alkali treatment.

7. A process according to claim 6, wherein a radical polymerization catalyst is added to said composition.

8. A process according to claim 7, wherein said radical polymerization catalyst is selected from benzoyl peroxide, lauroyl peroxide, cumene hydroperoxide, ditert-butyl peroxide, diisopropylperoxycarbonate and azobisisobutyronitrile.

9. A process according to claim 6, wherein said hydration treatment is carried out by immersing the resulting hard lens in a solution of an alkali metal salt in normal saline solution at room temperature or with heating and then immersing in normal saline solution several times.

10. A process according to claim 6, wherein said hydration treatment is carried out by immersing the resulting hard lens in normal saline solution, immersing in a solution of an alkali metal salt in normal saline solution and then immersing in normal saline solution several times.

11. A process according to claim 10, wherein said alkali metal salt is selected from sodium carbonate, potassium carbonate, lithium carbonate, sodium hydrogen carbonate and potassium hydrogen carbonate.

* * * * *